United States Patent
Otomo

(10) Patent No.: US 6,813,088 B2
(45) Date of Patent: Nov. 2, 2004

(54) PROJECTION OPTICAL SYSTEM AND PROJECTION EXPOSURE DEVICE WHICH USES SAME

(75) Inventor: Ryoko Otomo, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/453,582

(22) Filed: Jun. 4, 2003

(65) Prior Publication Data

US 2003/0227693 A1 Dec. 11, 2003

(30) Foreign Application Priority Data

Jun. 7, 2002 (JP) ........................................ 2002-166472

(51) Int. Cl.[7] ..................... G02B 13/22; G02B 13/26; G02B 15/14
(52) U.S. Cl. ..................... 359/663; 359/686; 359/650
(58) Field of Search ..................... 359/679, 676–690, 359/663, 744, 740, 649, 650

(56) References Cited

U.S. PATENT DOCUMENTS

| | | | | |
|---|---|---|---|---|
| 3,728,010 A | * | 4/1973 | Mikami | 359/679 |
| 4,514,049 A | * | 4/1985 | Hirano | 359/679 |
| 4,867,545 A | * | 9/1989 | Wakimoto et al. | 359/663 |
| 5,414,561 A | * | 5/1995 | Wakimoto et al. | 359/663 |
| 5,696,631 A | * | 12/1997 | Hoffman | 359/649 |
| 5,805,347 A | * | 9/1998 | Mizutani et al. | 359/663 |
| 5,991,090 A | * | 11/1999 | Strahle | 359/660 |

FOREIGN PATENT DOCUMENTS

JP 3026648 1/2000

* cited by examiner

Primary Examiner—Georgia Epps
Assistant Examiner—Deborah A. Raizen
(74) Attorney, Agent, or Firm—Arnold International; Jon W. Henry; Bruce Y. Arnold

(57) ABSTRACT

A projection optical system that is telecentric or very nearly telecentric on both sides is formed of four positive lens groups with a central diaphragm for achieving at least very nearly unity magnification. The second and third lens groups are movable along the optical axis of the projection optical system, preferably at the same rate and in the same direction, in order to vary the magnification of the projection optical system. The range of movement of the second and third lens groups includes a position where the first and second lens groups together are a mirror image about the plane of the diaphragm of the third and fourth lens groups together. A projection exposure device uses the projection optical system to form an image of an illuminating beam modulated by a mask pattern on a workpiece. An image magnification detector controls movement of the second and third lens groups.

16 Claims, 11 Drawing Sheets

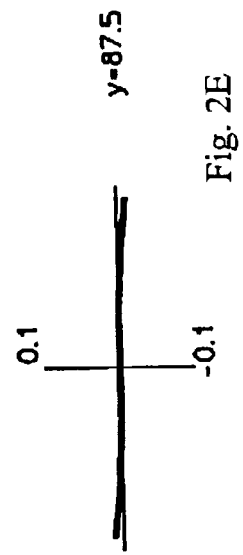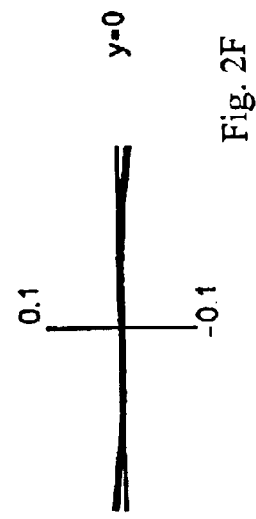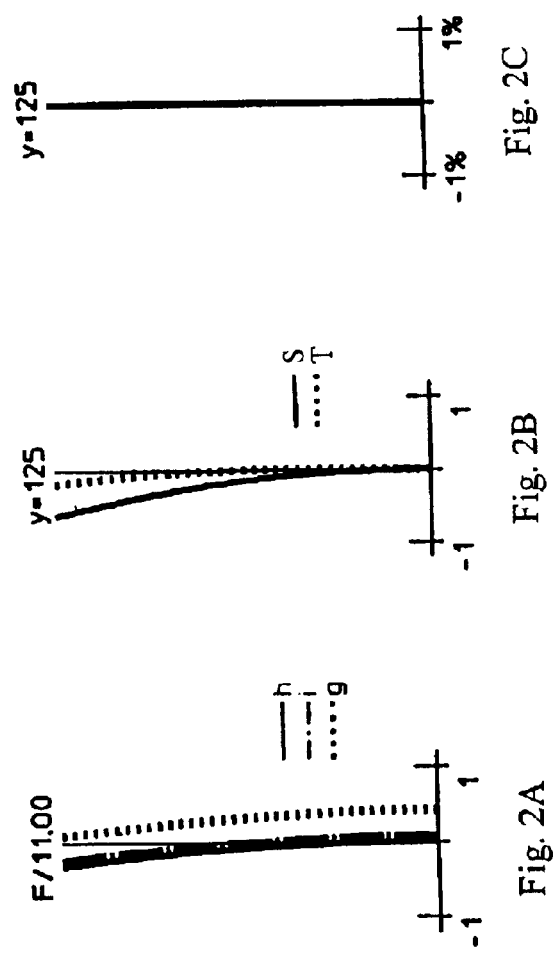

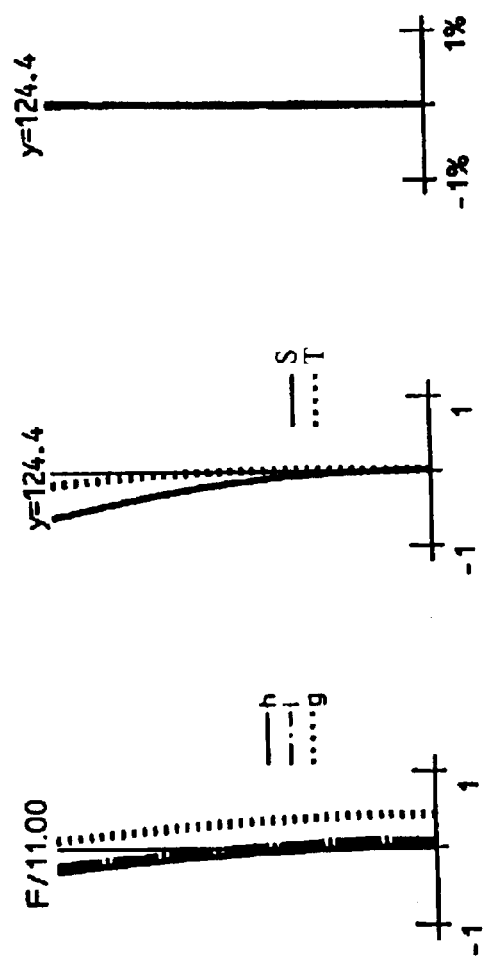
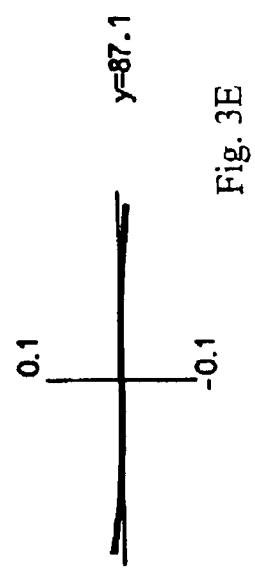
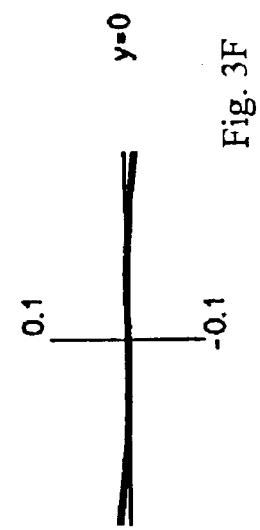

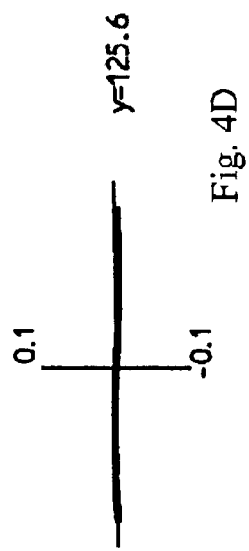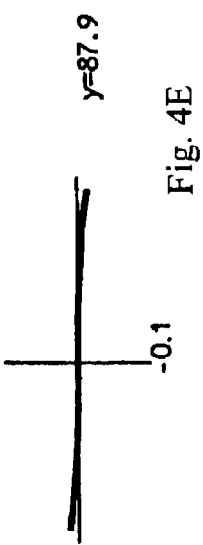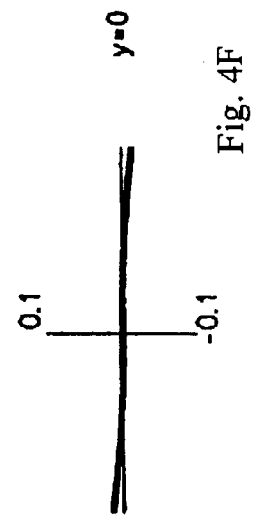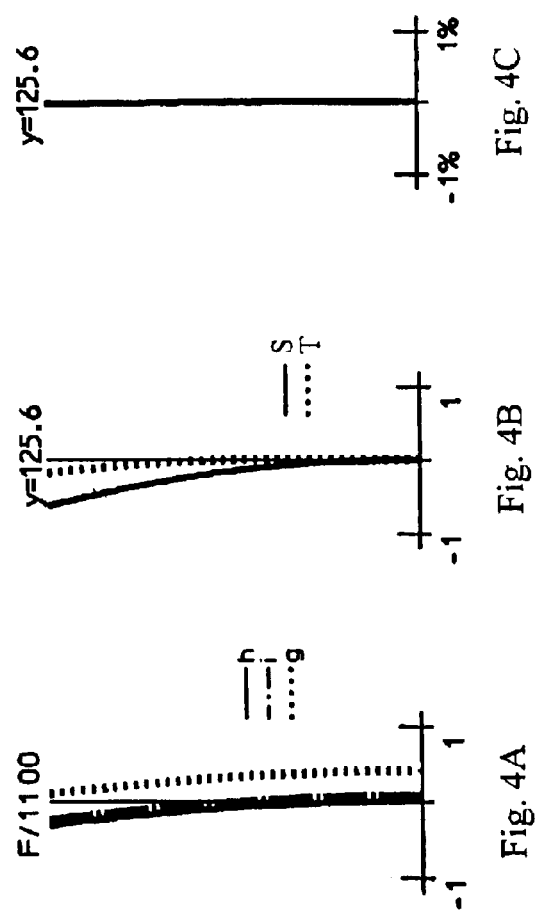

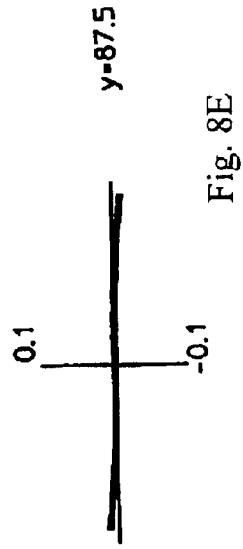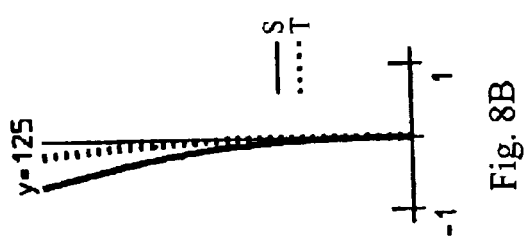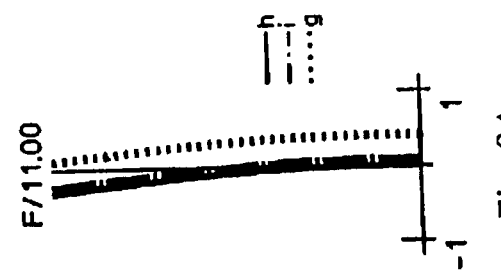

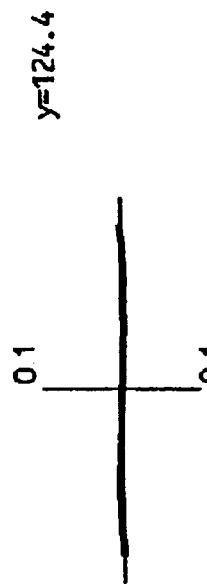
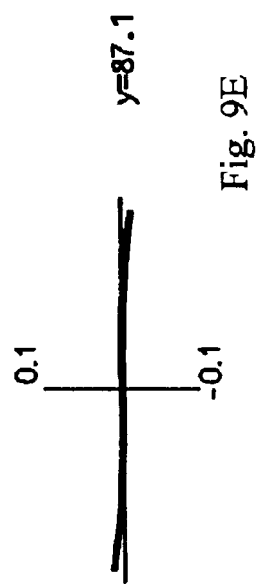
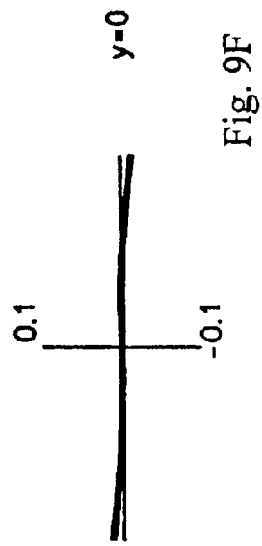
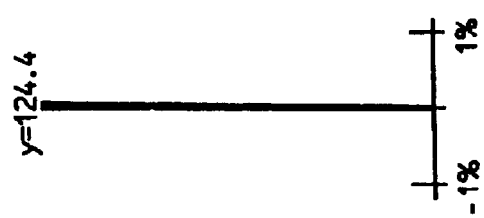

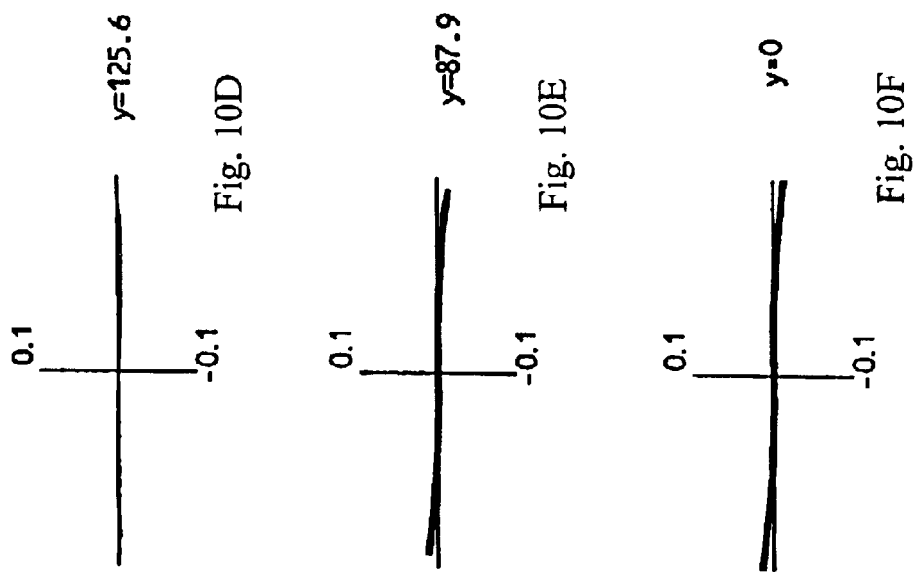
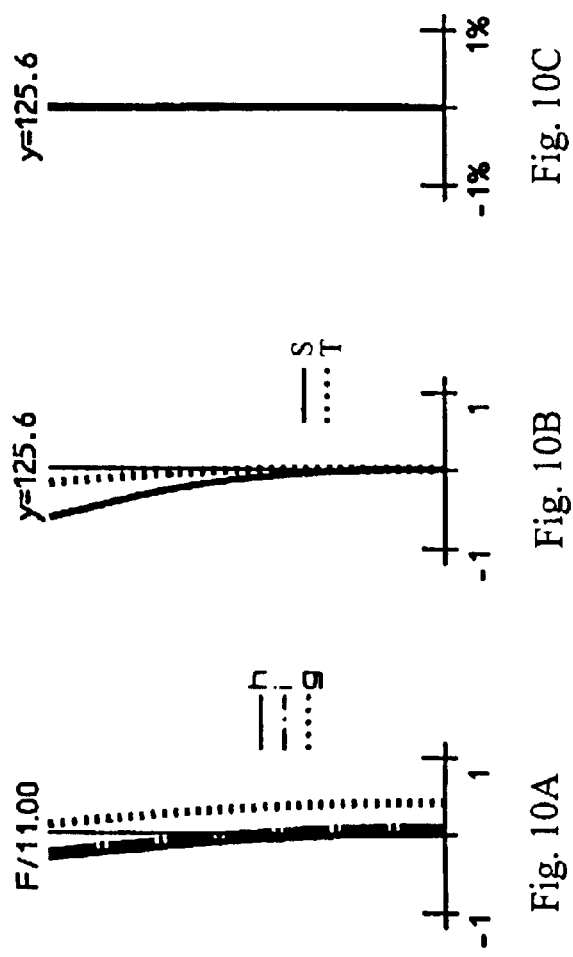

PROJECTION OPTICAL SYSTEM AND PROJECTION EXPOSURE DEVICE WHICH USES SAME

This application is related in subject matter to applicant's U.S. application Ser. No. 10/101,069 filed Mar. 20, 2002, with both inventions having been commonly assigned.

BACKGROUND OF THE INVENTION

In the manufacture of printed substrates, projection optical systems and projection exposure devices have been known for projecting images of original patterns on workpieces. In particular, Japanese Patent No. 3026648 discloses a unity magnification projection lens system that is symmetric about the center line of the lens system where a diaphragm may be placed, and the light beams entering and exiting the lens systems are at least nearly telecentric on both the object and image sides. Unity magnification imaging is based on the symmetry of the lens system about the center line where a diaphragm may be placed. However, generally creating a lens system that is perfectly symmetrical is very difficult due to manufacturing tolerances of the components, tolerances in assembling the components, and other factors. As a result, the imaging magnification tends to vary slightly from unity magnification. Therefore, each lens system must be individually adjusted during assembly.

Additionally, when exposing a plurality of patterns onto the same substrate, it becomes necessary to overlap and match the image accurately, generally requiring slight adjustments to magnification, corresponding to the expansion and contraction of a substrate with temperature changes and the like, prior to the exposures. Generally, in order to change the image magnification of a lens system, the entire lens system may be moved in the optical axis direction. However, with projection lens systems as described above, for which both the object side and the image side are made to be telecentric, magnification cannot be changed by moving the entire lens system in the optical axis direction while maintaining the telecentric conditions.

Furthermore, there is a demand for improvements of the known projection exposure devices of the type described above for exposing a larger area of a workpiece in a single projection exposure.

BRIEF SUMMARY OF THE INVENTION

The present invention relates to a projection optical system and a projection exposure device, and especially relates to projection optical systems and projection exposure devices used in the manufacture of printed substrates and similar substrates. The projection optical system of the present invention is symmetrical about a center line where a diaphragm or stop is placed and remains at least very nearly telecentric on both the object and image sides as the imaging magnification is slightly varied to adjust for, for example, expansion and contraction of the substrate that accompany temperature changes, as well as to correct for variations from unity magnification due to manufacturing tolerances, while maintaining favorable correction of aberrations in all adjusted positions.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A-2C show the spherical aberration, astigmatism, and distortion, respectively, of the projection optical system according to Embodiment 1 at unity magnification;

FIGS. 2D-2F show transverse aberrations at various image heights of the projection optical system according to Embodiment 1 at unity magnification;

FIGS. 3A-3C show the spherical aberration, astigmatism, and distortion, respectively, of the projection optical system according to Embodiment 1 at a magnification of 0.995;

FIGS. 3D-3F show transverse aberrations at various image heights of the projection optical system according to Embodiment 1 at a magnification of 0.995;

FIGS. 4A-4C show the spherical aberration, astigmatism, and distortion, respectively, of the projection optical system according to Embodiment 1 at a magnification of 1.005;

FIGS. 4D-4F show transverse aberrations at various image heights of the projection optical system according to Embodiment 1 at a magnification of 1.005;

FIGS. 8A-8C show the spherical aberration, astigmatism, and distortion, respectively, of the projection optical system according to Embodiment 3 at unity magnification;

FIGS. 8D-8F show transverse aberrations at various image heights of the projection optical system according to Embodiment 3 at unity magnification;

FIGS. 9A-9C show the spherical aberration, astigmatism, and distortion, respectively, of the projection optical system according to Embodiment 3 at a magnification of 0.995;

FIGS. 9D-9F show transverse aberrations at various image heights of the projection optical system according to Embodiment 3 at a magnification of 0.995;

FIGS. 10A-10C show the spherical aberration, astigmatism, and distortion, respectively, of the projection optical system according to Embodiment 3 at a magnification of 1.005;

FIGS. 10D-10F show transverse aberrations at various image heights of the projection optical system according to Embodiment 3 at a magnification of 1.005;

DETAILED DESCRIPTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transversely of the optical axis of the lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

Figure 1:
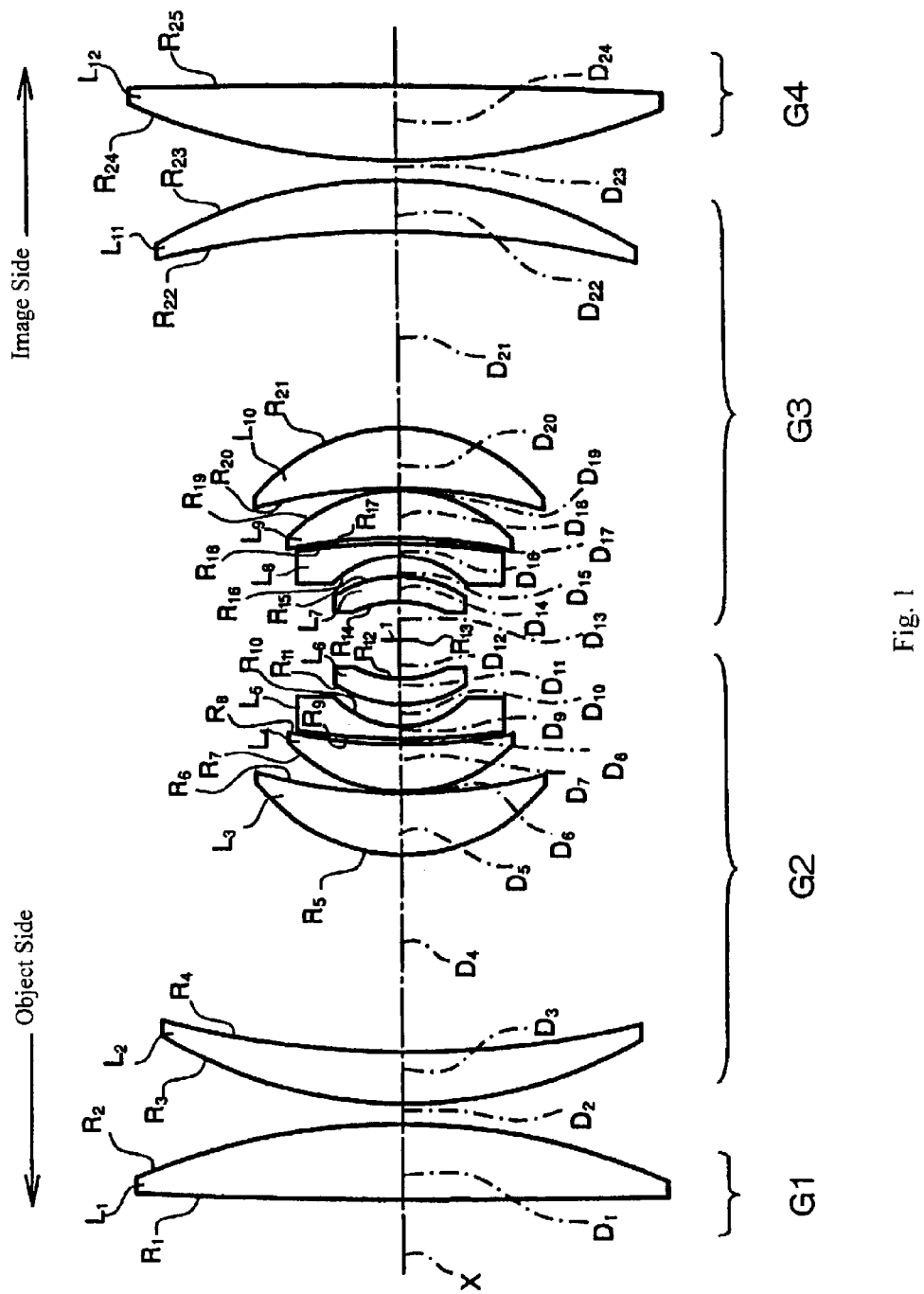
FIG. 1 shows a cross-sectional view of the projection optical system according to Embodiment 1.

A general description of the preferred embodiments of the projection optical system of the present invention will now be described with reference to FIG. 1 that shows Embodiment 1. In FIG. 1, lens groups are referenced by the letter G followed by a number denoting their order from the object side of the lens, from G1 to G4, and lens elements are referenced by the letter L followed by a number denoting their order from the object side of the lens, from L1 to L12. Similarly, the radii of curvature of the optical surfaces of all the optical elements, including a diaphragm or stop 1 at the center of the projection optical system, are referenced by the letter R followed by a number denoting their order from the object side of the lens, from R1 to R25 for Embodiments 1–3 that follow. The on-axis surface spacings (along the optical axis X in FIG. 1) of all the optical element surfaces are referenced by the letter D followed by a number denoting their order from the object side of the lens, from D1 to D24 for Embodiments 1–3 that follow. In FIG. 1, an arrow at the top left points toward the object side and an arrow at the top right points toward the image side of the projection optical system.

With regard to the definitions of "lens component" and "lens element" above, the present invention may variously be described in terms of lens elements or in terms of lens components. The use of these terms in describing preferred embodiments of the invention should not be taken to limit the scope of the invention to these preferred embodiments. For example, if certain conditions satisfied by preferred embodiments of the invention are described in terms of features of lens elements that are also lens components, these conditions may also be described in terms of lens components as appropriate. One skilled in the art will recognize from the descriptions that follow when lens elements are also lens components and when lens components include more than one lens element based on the definitions of the terms "lens element" and "lens component" above.

Additionally, in the following explanations of the preferred embodiments, the phrase "very nearly" will be used in terms of various attributes, for example, "very nearly telecentric," "very nearly unity magnification," "very nearly symmetric," and "very nearly the mirror image." The phrase "very nearly" means that slight variations from exact satisfaction of each of the attributes being described may occur but these variations are small throughout a described small range of movement of various lens groups or at a particular position of the various lens groups. For example, at a position of unity magnification of the projection optical system, the attributes are well defined for those skilled in the art.

As shown in FIG. 1, the projection optical system of the present invention includes, in order from the object side, a first lens group G1, a second lens group G2, a diaphragm, a third lens group G3, and a fourth lens group G4. All four lens groups, G1–G4, have positive refractive power and therefore may be termed positive lens groups. The first and fourth lens groups, G1 and G4, operate as telecentric lens groups so that the projection optical system is or is very nearly telecentric on both the object side and the image side.

The second and third lens groups, G2 and G3, may be moved to vary the magnification of the projection optical system. Preferably, the second and third lens groups, G2 and G3, move at the same rate and in the same direction, for example, by the second and third lens groups G2 and G3 being joined together, in order to achieve unity magnification or to vary the magnification slightly from unity magnification. Additionally, the diaphragm 1 may be joined to the lens groups G2 and G3 for movement together with these lens groups. The range of movement of said second lens group G2 and said third lens group G3 along the optical axis X of the projection optical system includes a position where the first lens group G1 and the second lens group G2 as a first lens unit and the third lens group G3 and the fourth lens group G4 as a second lens unit are positioned symmetrically on opposite sides of a plane that includes the diaphragm 1 so that the first and second lens units are mirror images of one another with regard to that plane so that the optical projection system achieves at least very nearly unity magnification when said second lens group G2 and said third lens group G3 are at that position. The projection optical system is also designed to minimize aberrations in all positions of magnification adjustment.

Additionally, preferably the following condition is satisfied:

$$1.6 < f2/f(1\text{-}2) < 1.9 \qquad \text{Condition (1)}$$

where f2 is the focal length of the second lens group G2 of the projection optical system, and f(1-2) is the composite focal length of the first lens group G1 and the second lens group G2.

The focal length f2 of the second lens group G2 and the composite focal length (1-2) of the first lens group G1 and the second lens group G2 are determined to satisfy Condition (1) for the following reasons. The ratio of focal lengths of Condition (1) falling below the lower limit of Condition (1) is associated with the positive power of the second lens group G2 becoming stronger and magnification changing so rapidly with movement of the inner lens groups G2 and G3 that precision adjustment of the magnification of the projection optical system to a desired magnification becomes difficult. On the other hand, the ratio of focal lengths of Condition (1) exceeding the upper limit of Condition (1), although associated with weakening of the positive power of the second lens group G2 and thus allowing precision adjustment of the magnification of the projection optical system, results in mechanical design of the projection optical system becoming more difficult because of the large amount of movement of the inner lens groups G2 and G3 required to adjust the magnification of the projection optical system.

Furthermore, a projection exposure device of the present invention uses any of the projection optical systems described in the previous several paragraphs and is constructed to project and expose upon a workpiece an image of an original pattern illuminated by an illumination optical system.

Three preferred embodiments of the magnification adjustable lens of the present invention will now be individually described with reference to the drawings.

EMBODIMENT 1

FIG. 1 shows the basic lens element configurations of a projection optical system according to Embodiment 1 of the present invention. The same basic lens element configurations are used in the lenses of Embodiments 1–3 of the present invention.

As shown in FIG. 1, the projection optical system of Embodiment 1 includes, in order from the object side, a positive first lens group G1 arranged so that the input light beams are telecentric on the object side, a positive second lens group G2 that has a magnification adjustment function and an imaging function including aberration correction, a diaphragm 1, a positive third lens group G3 which has a magnification adjustment function and an imaging function including aberration correction, and a positive fourth lens group G4 arranged so that the output light beams are telecentric on the image side. As explained previously, the projection optical system is at least very nearly symmetric about the diaphragm 1.

As shown in FIG. 1, the first lens group G1 is formed as a fixed biconvex lens element with its lens surface of greater curvature (lesser radius of curvature) on the image side. The second lens group G2 includes, in order from the object side, a lens element L2 that is of positive refractive power and that is a meniscus lens element with its lens surface of greater curvature on the object side, a third lens element L3, a fourth lens element L4, a fifth lens element L5 that is of negative refractive power and that is a meniscus lens element with its convex lens surface on the object side, and a sixth lens element L6 that is of positive refractive power and that is a meniscus lens element with its convex lens surface on the object side. The second lens group G2 is movable along the optical axis X in order to vary the magnification of the projection optical system.

The third lens group G3 is formed at least very nearly as the mirror image of the second lens group G2 about the plane of the diaphragm 1 and is also movable along the optical axis in order to vary the magnification of the projection optical system. The third lens group includes, in order from the object side, a seventh lens element L7 of positive refractive power and a meniscus shape with its convex surface on the image side, an eighth lens element L8 of negative refractive power and a meniscus shape with its convex surface on the image side, a ninth lens element L9 that is of positive refractive power and a meniscus shape with its convex surface on the image side, a tenth lens element L10, and an eleventh lens element L11.

The fourth lens group G4 is formed as a fixed biconvex lens element with its lens surface of greater curvature on the object side. The fourth lens group G4 is at least very nearly the mirror image of the first lens group G1 about the plane of the diaphragm 1 when the second and third lens groups G2 and G3 are symmetrically arranged about the plane of the diaphragm 1 and the projection optical system is arranged for unity magnification.

As described above, the first lens group G1 and the fourth lens group G4 have a telecentric function for the light beams on the object side and on the image side, respectively, of the projection optical system. Additionally, the second lens group G2 and the third lens group G3 are movable uniformly the same distance in the same direction along the optical axis X in order to vary the magnification of the projection optical system. Because only the second lens group G2 and the third lens group G3 are moved at the time of magnification adjustment, and they are moved the same distance and in the same direction, magnification can be changed while minimizing fluctuations in aberrations.

Table 1 below lists the surface number #, in order from the object side, the radius of curvature R (in mm) of each surface, the on-axis surface spacing D (in mm) between surfaces, as well as the refractive index $N_\lambda$ (at the h-line wavelength $\lambda$ of 404.66 nm) of each optical element for Embodiment 1. Listed in the bottom portion of Table 1 are the focal length f and the f-number $F_{NO}$ of the optical projection system of Embodiment 1, the focal length f2 of the second lens group G2 of the projection optical system, the composite focal length f(1-2) of the first lens group G1 and the second lens group G2, and the ratio f2/(1-2) that satisfies Condition (1). All values in Table 1 are given for the most symmetric arrangement of the lens elements with the on-axis surface spacings $D_2$ and $D_{23}$ being equal to 10.935 mm that is associated with unity magnification of the projection optical system. Adjustment of the positions of lens groups G2 and G3 will not only change those on-axis spacings $D_2$ and $D_{23}$ but will also change slightly the focal length f of the projection optical system, the focal length f(1-2), and thereby the ratio f2/f(1-2) of Condition (1) from the values listed in Table 1 below.

TABLE 1

| # | R | D | $N_\lambda$ |
|---|---|---|---|
| 1 | 4147.416 | 40.075 | 1.52973 |
| 2 | −358.736 | 10.935 | |
| 3 | 245.004 | 28.319 | 1.52973 |
| 4 | 522.590 | 107.227 | |
| 5 | 96.118 | 33.381 | 1.49895 |
| 6 | 268.605 | 1.155 | |
| 7 | 80.601 | 26.021 | 1.50726 |
| 8 | 279.428 | 3.375 | |
| 9 | 340.818 | 6.916 | 1.59065 |
| 10 | 49.175 | 11.468 | |
| 11 | 60.172 | 14.287 | 1.49895 |
| 12 | 55.864 | 21.248 | |
| 13 (stop) | ∞ | 21.248 | |
| 14 | −55.864 | 14.287 | 1.49895 |
| 15 | −60.172 | 11.468 | |

TABLE 1-continued

| # | R | D | $N_\lambda$ |
|---|---|---|---|
| 16 | −49.175 | 6.916 | 1.59065 |
| 17 | −340.818 | 3.375 | |
| 18 | −279.428 | 26.021 | 1.50726 |
| 19 | −80.601 | 1.155 | |
| 20 | −268.605 | 33.381 | 1.49895 |
| 21 | −96.118 | 107.227 | |
| 22 | −522.590 | 28.319 | 1.52973 |
| 23 | −245.004 | 10.935 | |
| 24 | 358.736 | 40.075 | 1.52973 |
| 25 | −4147.416 | | | f = 2000 mm   $F_{NO}$ = 11.0   f2 = 348.603   f(1-2) = 195.793
f2/f(1-2) = 1.780

FIGS. 2A-2C show the spherical aberration, astigmatism, and distortion, respectively, of the optical projection system of Embodiment 1 at unity magnification. In FIG. 2A, the spherical aberration is shown for the g-line (λ=435.8 nm), the h-line (λ=404.66 nm), and the i-line (λ=365 nm) at an $F_{NO}$ equal to 11.0. In FIG. 2B, the astigmatism for the sagittal image surface is shown by the solid line curve and the astigmatism for the tangential image surface is shown by the dash line curve. FIGS. 2D-2F show the transverse aberration at various image heights of the projection optical system of Embodiment 1 at unity magnification.

FIGS. 3A-3F show aberration curves for Embodiment 1 corresponding to FIGS. 2A-2F, respectively, but with a magnification of the optical projection system of 0.995 based on uniform movement of the second and third lens groups G2 and G3. Similarly, FIGS. 4A-4F show aberration curves for Embodiment 1 corresponding to FIGS. 2A-2F, respectively, but with a magnification of the optical projection system of 1.005 based on uniform movement of the second and third lens groups G2 and G3.

As is evident from FIGS. 2A-4F, according to the projection optical system of Embodiment 1, Condition (1) is satisfied and favorable aberration correction is achieved even with slight adjustment of the projection optical system from unity magnification. Magnification adjustment in a range within ±0.5% from unity magnification may be used to correct variations in magnification due to manufacturing tolerances in components, as well as to compensate for expansion or contraction of a workpiece substrate on which a pattern is being imaged, caused for example by temperature changes of the substrate. Additionally, the working range of the projection optical system extends to an image height y of 125.6 mm that encompasses a larger working area than comparable prior art projection optical systems.

EMBODIMENT 2

Embodiment 2 is very similar to Embodiment 1 and differs from Embodiment 1 in its lens elements configuration only by different radii of curvature of lens surfaces, different optical element surface spacings, and different indexes of refraction of the lens element materials. Therefore, Embodiment 2 is well shown by FIG. 1.

Table 2 below lists the surface number #, in order from the object side, the radius of curvature R (in mm) of each surface, the on-axis surface spacing D (in mm) between surfaces, as well as the refractive index $N_\lambda$ (at the h-line wavelength λ of 404.66 nm) of each optical element for Embodiment 1. Listed in the bottom portion of Table 2 are the focal length f and the f-number $F_{NO}$ of the optical projection system of Embodiment 2, the focal length f2 of the second lens group G2 of the projection optical system, the composite focal length f(1-2) of the first lens group G1 and the second lens group G2, and the ratio f2/f(1-2) that satisfies Condition (1). All values in Table 2 are given for the most symmetric arrangement of the lens elements with the on-axis surface spacings $D_2$ and $D_{23}$ being equal to 11.226 mm that is associated with unity magnification of the projection optical system. Adjustment of the positions of lens groups G2 and G3 will not only change those on-axis spacings $D_2$ and $D_{23}$ but will also change slightly the focal length f of the projection optical system, the focal length f(1-2), and thereby the ratio f2/f(1-2) of Condition (1) from the values listed in Table 2 below.

TABLE 2

| # | R | D | $N_\lambda$ |
|---|---|---|---|
| 1 | 4260.221 | 40.415 | 1.52975 |
| 2 | −361.760 | 11.226 | |
| 3 | 248.823 | 28.852 | 1.52975 |
| 4 | 525.814 | 108.214 | |
| 5 | 96.813 | 32.944 | 1.49898 |
| 6 | 270.445 | 1.123 | |
| 7 | 81.770 | 25.195 | 1.50726 |
| 8 | 276.381 | 3.799 | |
| 9 | 336.915 | 7.858 | 1.59064 |
| 10 | 49.854 | 12.344 | |
| 11 | 60.815 | 14.697 | 1.49898 |
| 12 | 56.364 | 21.201 | |
| 13 (stop) | ∞ | 21.201 | |
| 14 | −56.364 | 14.697 | 1.49898 |
| 15 | −60.815 | 12.344 | |
| 16 | −49.854 | 7.858 | 1.59064 |
| 17 | −336.915 | 3.799 | |
| 18 | −276.381 | 25.195 | 1.50726 |
| 19 | −81.770 | 1.123 | |
| 20 | −270.445 | 32.944 | 1.49898 |
| 21 | −96.813 | 108.214 | |
| 22 | −525.814 | 28.852 | 1.52975 |
| 23 | −248.823 | 11.226 | |
| 24 | 361.760 | 40.415 | 1.52975 |
| 25 | −4260.221 | | | f = 2000 mm   $F_{NO}$ = 11.0   f2 = 354.600   f(1-2) = 198.572
f2/f(1-2) = 1.786

Figures 5D, 5E, 5F:
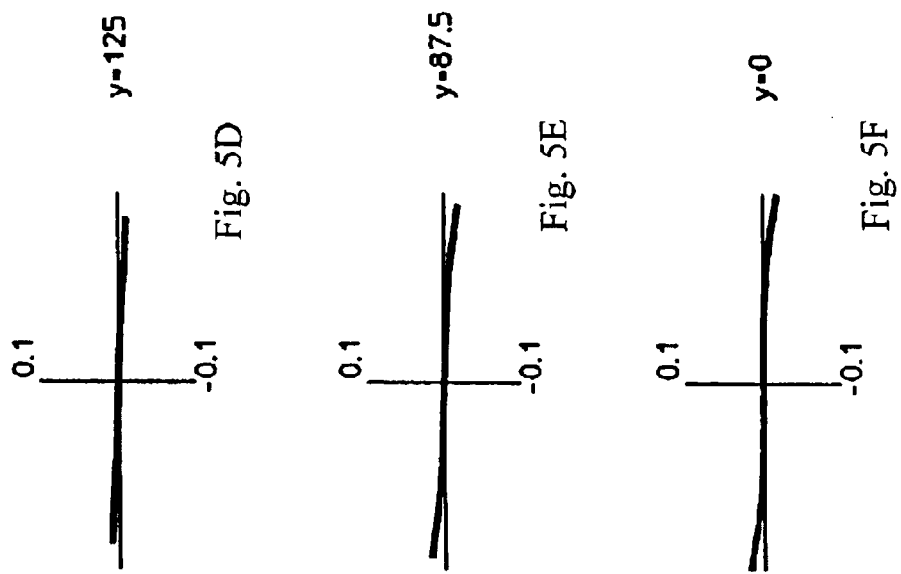
FIGS. 5D-5F show transverse aberrations at various image heights of the projection optical system according to Embodiment 2 at unity magnification.
Figure 5C:
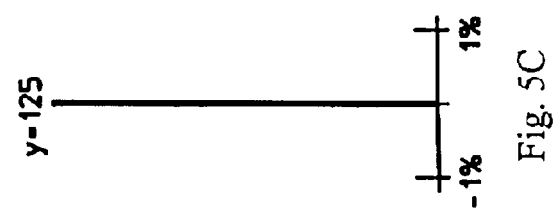
FIGS. 5A-5C show the spherical aberration, astigmatism, and distortion, respectively, of the projection optical system according to Embodiment 2 at unity magnification.
Figure 5B:
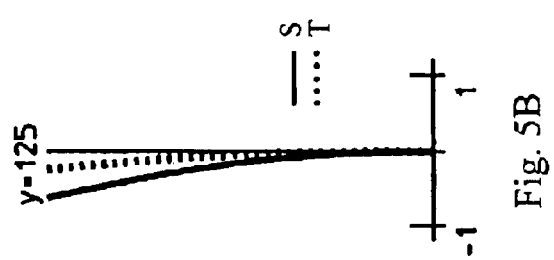
Figure 5A:
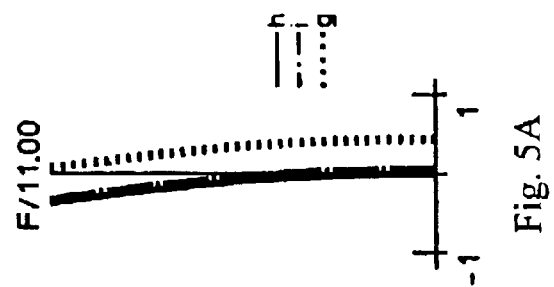
Figure 6D:
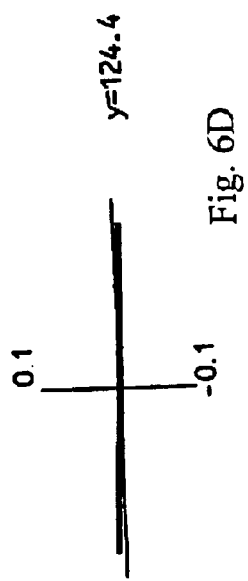
FIGS. 6D-6F show transverse aberrations at various image heights of the projection optical system according to Embodiment 2 at a magnification of 0.995.
Figure 6E:
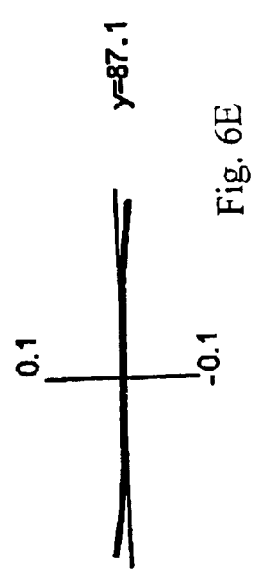
Figure 6F:
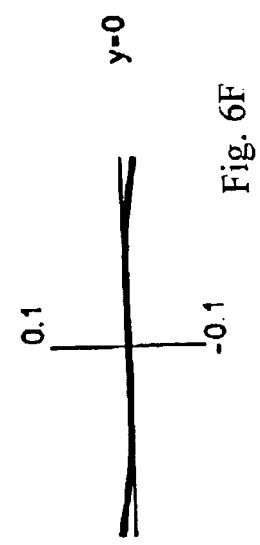
Figure 6C:
FIGS. 6A-6C show the spherical aberration, astigmatism, and distortion, respectively, of the projection optical system according to Embodiment 2 at a magnification of 0.995.
Figure 6B:
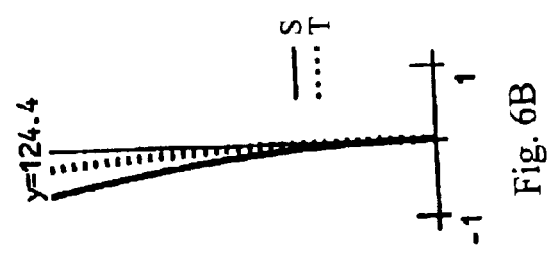
Figure 6A:
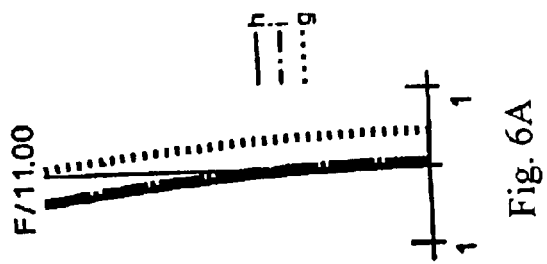
Figure 7D:
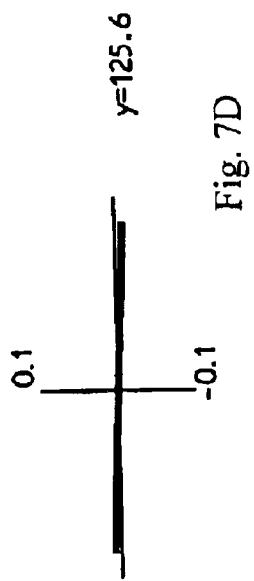
FIGS. 7D-7F show transverse aberrations at various image heights of the projection optical system according to Embodiment 2 at a magnification of 1.005.
Figure 7E:
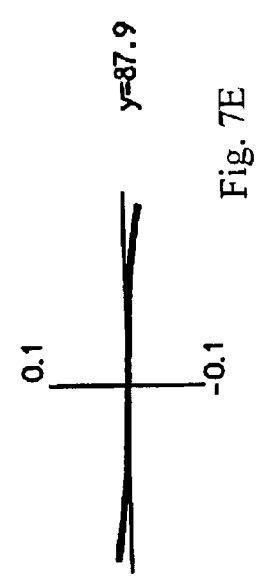
Figure 7F:
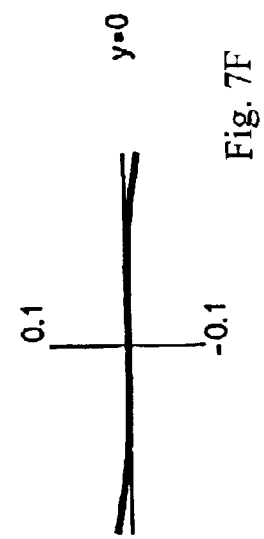
Figure 7C:
FIGS. 7A-7C show the spherical aberration, astigmatism, and distortion, respectively, of the projection optical system according to Embodiment 2 at a magnification of 1.005.
Figure 7B:
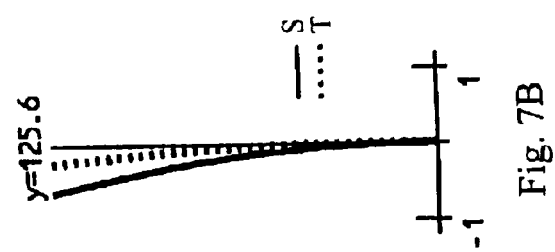
Figure 7A:
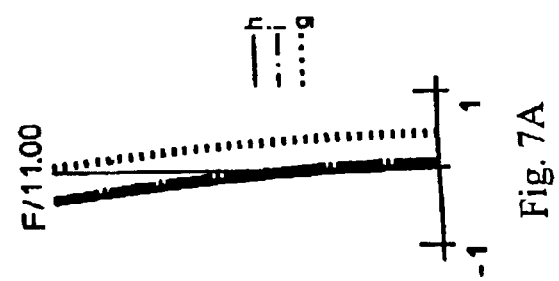

FIGS. 5A-5C show the spherical aberration, astigmatism, and distortion, respectively, of the optical projection system of Embodiment 2 at unity magnification. In FIG. 5A, the spherical aberration is shown for the g-line (λ=435.8 nm), the h-line (λ=404.66 nm), and the i-line (λ=365 nm) at an $F_{NO}$ equal to 11.0. In FIG. 5B, the astigmatism for the sagittal image surface is shown by the solid line curve and the astigmatism for the tangential image surface is shown by the dash line curve. FIGS. 5D-5F show the transverse aberration at various image heights of the projection optical system of Embodiment 2 at unity magnification.

FIGS. 6A-6F show aberration curves for Embodiment 2 corresponding to FIGS. 5A-5F, respectively, but with a magnification of the optical projection system of 0.995 based on uniform movement of the second and third lens groups G2 and G3. Similarly, FIGS. 7A-7F show aberration curves for Embodiment 2 corresponding to FIGS. 5A-5F, respectively, but with a magnification of the optical projection system of 1.005 based on uniform movement of the second and third lens groups G2 and G3.

As is evident from FIGS. 5A-7F, according to the projection optical system of Embodiment 2, Condition (1) is satisfied and favorable aberration correction is achieved even with slight adjustment of the projection optical system from unity magnification. Magnification adjustment in a range within ±0.5% from unity magnification may be used to correct variations in magnification due to manufacturing tolerances in components, as well as to compensate for expansion or contraction of a workpiece substrate on which a pattern is being imaged, caused for example by temperature changes of the substrate. Additionally, the working range of the projection optical system extends to an image height y of 125.6 mm that encompasses a larger working area than comparable prior art projection optical systems.

EMBODIMENT 3

Embodiment 3 is very similar to Embodiment 1 and differs from Embodiment 1 in its lens elements configuration only by different radii of curvature of lens surfaces, different optical element surface spacings, and different indexes of refraction of the lens element materials. Therefore, Embodiment 3 is well shown by FIG. 1.

Table 3 below lists the surface number #, in order from the object side, the radius of curvature R (in mm) of each surface, the on-axis surface spacing D (in mm) between surfaces, as well as the refractive index $N_\lambda$ (at the h-line wavelength λ of 404.66 nm) of each optical element for Embodiment 3. Listed in the bottom portion of Table 3 are the focal length f and the f-number $F_{NO}$ of the optical projection system of Embodiment 3, the focal length f2 of the second lens group G2 of the projection optical system, the composite focal length f(1-2) of the first lens group G1 and the second lens group G2, and the ratio f2/f(1-2) that satisfies Condition (1). All values in Table 3 are given for the most symmetric arrangement of the lens elements with the on-axis surface spacings $D_2$ and $D_{23}$ being equal to 10.987 mm that is associated with unity magnification of the projection optical system. Adjustment of the positions of lens groups G2 and G3 will not only change those on-axis spacings $D_2$ and $D_{23}$ but will also change slightly the focal length f of the projection optical system, the focal length f(1-2), and thereby the ratio f2/f(1-2) of Condition (1) from the values listed in Table 3 below.

TABLE 3

| # | R | D | $N_\lambda$ |
|---|---|---|---|
| 1 | 4158.940 | 39.139 | 1.52975 |
| 2 | −349.647 | 10.987 | |
| 3 | 238.434 | 27.970 | 1.52975 |
| 4 | 509.663 | 104.553 | |
| 5 | 93.638 | 32.459 | 1.49898 |
| 6 | 261.559 | 1.096 | |
| 7 | 78.497 | 25.158 | 1.50726 |
| 8 | 272.203 | 3.364 | |
| 9 | 332.210 | 6.881 | 1.59064 |
| 10 | 47.904 | 11.240 | |
| 11 | 58.581 | 14.036 | 1.49898 |
| 12 | 54.334 | 20.625 | |
| 13 (stop) | ∞ | 20.625 | |
| 14 | −54.334 | 14.036 | 1.49898 |
| 15 | −58.581 | 11.240 | |
| 16 | −47.904 | 6.881 | 1.59064 |
| 17 | −332.210 | 3.364 | |
| 18 | −272.203 | 25.158 | 1.50726 |
| 19 | −78.497 | 1.096 | |
| 20 | −261.559 | 32.459 | 1.49898 |
| 21 | −93.638 | 104.553 | |
| 22 | −509.663 | 27.970 | 1.52975 |
| 23 | −238.434 | 10.987 | |
| 24 | 349.647 | 39.139 | 1.52975 |
| 25 | −4158.940 | | | f = 2000 mm   $F_{NO}$ = 11.0   f2 = 338.811   f(1-2) = 190.690
f2/f(1-2) = 1.777

FIGS. 8A-8C show the spherical aberration, astigmatism, and distortion, respectively, of the optical projection system of Embodiment 3 at unity magnification. In FIG. 8A, the spherical aberration is shown for the g-line (λ=435.8 nm), the h-line (λ=404.66 nm), and the i-line (λ=365 nm) at an $F_{NO}$ equal to 11.0. In FIG. 8B, the astigmatism for the sagittal image surface is shown by the solid line curve and the astigmatism for the tangential image surface is shown by the dash line curve. FIGS. 8D-8F show the transverse aberration at various image heights of the projection optical system of Embodiment 3 at unity magnification.

FIGS. 9A-9F show aberration curves for Embodiment 3 corresponding to FIGS. 8A-8F, respectively, but with a magnification of the optical projection system of 0.995 based on uniform movement of the second and third lens groups G2 and G3. Similarly, FIGS. 10A-10F show aberration curves for Embodiment 3 corresponding to FIGS. 8A-8F, respectively, but with a magnification of the optical projection system of 1.005 based on uniform movement of the second and third lens groups G2 and G3.

As is evident from FIGS. 8A-10F, according to the projection optical system of Embodiment 3, Condition (1) is satisfied and favorable aberration correction is achieved even with slight adjustment of the projection optical system from unity magnification. Magnification adjustment in a range within ±0.5% from unity magnification may be used to correct variations in magnification due to manufacturing tolerances in components, as well as to compensate for expansion or contraction of a workpiece substrate on which a pattern is being imaged, caused for example by temperature changes of the substrate. Additionally, the working range of the projection optical system extends to an image height y of 125.6 mm that encompasses a larger working area than comparable prior art projection optical systems.

Figure 11:
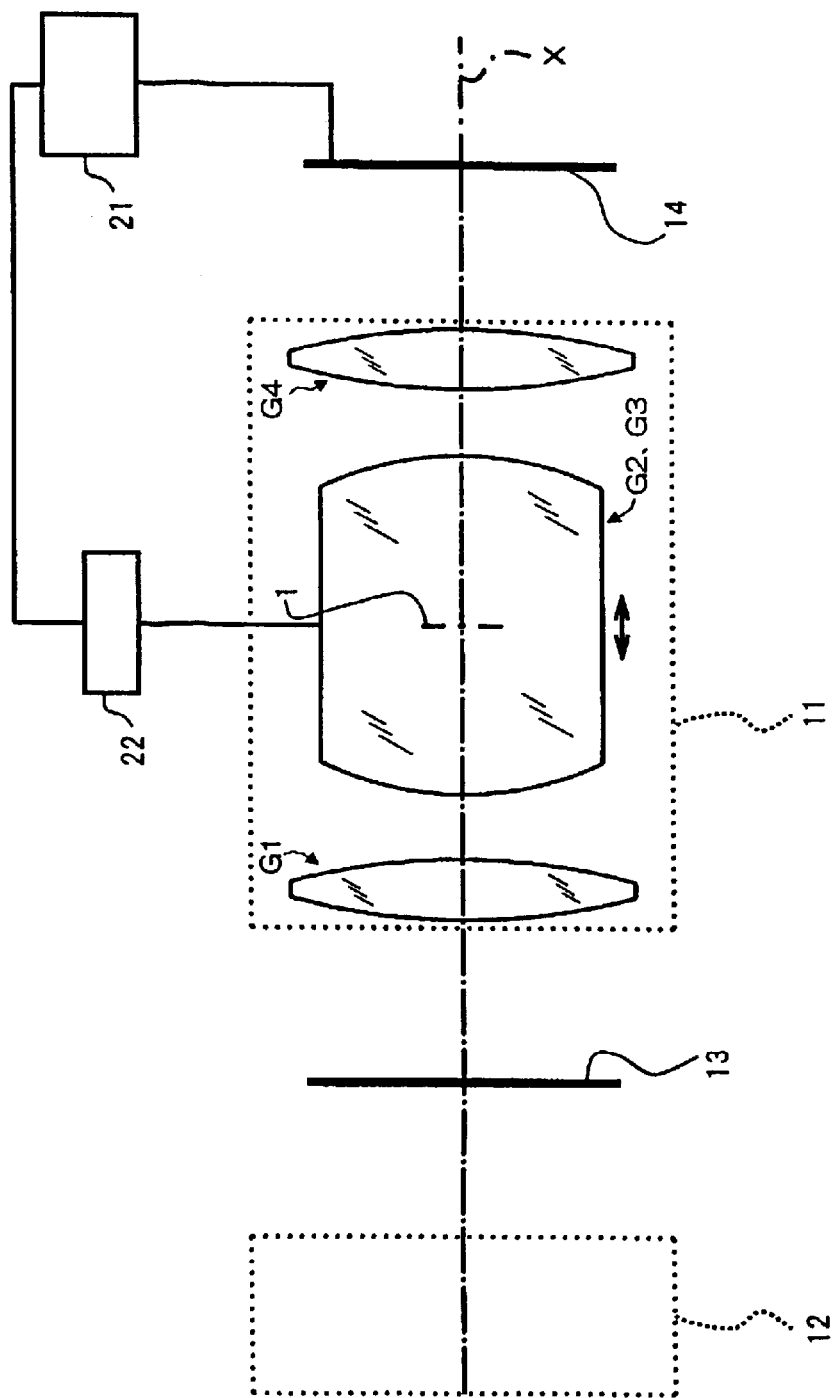
FIG. 11 shows a cross-sectional view of a projection exposure device that includes a projection optical system according to the present invention.

FIG. 11 shows a cross-sectional view of a projection exposure device that includes a projection optical system according to the present invention. As shown in FIG. 11, the projection exposure device includes a light source and an illumination optical system 12 that emits an illuminating beam to a mask pattern 13 for modulating the illuminating beam in order to provide object light for imaging by a projection optical system 11 as set forth in the previously described Embodiments 1–3 onto a workpiece 14, such as an exposed printed substrate. Additionally, the projection exposure device includes an imaging magnification detection device 21 for detecting the imaging magnification based on the size of the image of the mask pattern 13 at the plane of the workpiece 14. Based on the detected imaging magnification, a driving device 22 moves the second lens group G2 and the third lens group G3 (represented in FIG. 11 by a monolithic element with a central stop 1 of the projection optical system 11) the same distance and in the same direction along the optical axis X, as represented by the double ended arrow in FIG. 11.

In this way, the projection exposure device of FIG. 11 that uses the previously described Embodiments 1–3 of the projection optical system has the ability to easily and favorably adjust the imaging magnification according to the expansion and contraction of the workpiece 14 based on temperature changes and other factors, as well as to correct imaging magnification variations that result from manufacturing tolerances in the various components. The magnification adjustments and corrections may be performed automatically by detecting the imaging magnification with the imaging magnification detection device 21 initially and adjusting the positions of the second lens group G2 and third lens group G3 with the driving device 22 in order to achieve or maintain a prescribed magnification based on the detected imaging magnification.

The invention being thus described, it will be obvious that the same may be varied in many ways. For instance, values such as the radii of curvature R of the lens elements, the surface spacings D, and the refractive indexes $N_\lambda$ are not limited to the examples indicated in each of the aforementioned embodiments, as other values can be adopted. Also, the number of lens elements and their shapes, for example, using aspheric shapes, may be varied. Also, lens elements that act as lens components may variously be modified as lens components that include more than one lens element. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection optical system having an optical axis and comprised of, in order:
   a first lens group;
   a second lens group;
   a diaphragm;
   a third lens group; and
   a fourth lens group;
   wherein
      said second lens group and said third lens group are movable along the optical axis of the projection optical system in order to vary the magnification of the projection optical system;
      the range of movement of said second lens group and said third lens group along the optical axis includes a position where the first lens group and the second lens group as a first lens unit and the third lens group and the fourth lens group as a second lens unit are positioned symmetrically on opposite sides of a plane that includes said diaphragm so that the first and second lens units are mirror images of one another with regard to said plane so that the optical projection system achieves at least very nearly unity magnification when said second lens group and said third lens group are at said position; and
      the projection optical system is telecentric or very nearly telecentric on both sides.

2. A projection optical system having an optical axis and comprised of:
   a first lens group of positive refractive power;
   a second lens group of positive refractive power;
   a diaphragm;
   a third lens group of positive refractive power; and
   a fourth lens group of positive refractive power;
   wherein
      said second lens group and said third lens group are movable along the optical axis of the projection optical system in order to vary the magnification of the projection optical system; and
      the range of movement of said second lens group and said third lens group along the optical axis includes a position where the first lens group and the second lens group as a first lens unit and the third lens group and the fourth lens group as a second lens unit are positioned symmetrically on opposite sides of a plane that includes said diaphragm so that the first and second lens units are mirror images of one another with regard to said plane so that the optical projection system achieves at least very nearly unity magnification when said second lens group and said third lens group are at said position, and
      the projection optical system is telecentric or very nearly telecentric on both sides.

3. The projection optical system of claim 1, wherein said second lens group and said third lens group are movable in the same direction and at the same rate along the optical axis of the projection optical system in order to vary the magnification of the projection optical system.

4. The projection optical system of claim 2, wherein said second lens group and said third lens group are movable in the same direction and at the same rate along the optical axis of the projection optical system in order to vary the magnification of the projection optical system.

5. The projection optical system of claim 1, wherein the following condition is satisfied:

$$1.6 < f2/f(1\text{-}2) < 1.9$$

where
   f2 is the focal length of said second lens group, and
   f(1-2) is the composite focal length of said first lens group and said second lens group.

6. A projection optical system having an optical axis and comprised of:
   a first lens group of positive refractive power;
   a second lens group of positive refractive power;
   a diaphragm;
   a third lens group of positive refractive power; and
   a fourth lens group of positive refractive power;
   wherein
      said second lens group and said third lens group are movable along the optical axis of the projection optical system in order to vary the magnification of the projection optical system; and
      the range of movement of said second lens group and said third lens group along the optical axis includes a position where the first lens group and the second lens group as a first lens unit and the third lens group and the fourth lens group as a second lens unit are positioned symmetrically on opposite sides of a plane that includes said diaphragm so that the first and second lens units are mirror images of one another with regard to said plane so that the optical projection system achieves at least very nearly unity magnification when said second lens group and said third lens group are at said position, and
      the following condition is satisfied:

$$1.6 < f2/f(1\text{-}2) < 1.9$$

where
   f2 is the focal length of said second lens group, and
   f(1-2) is the composite focal length of said first lens group and said second lens group.

7. The projection optical system of claim 2, wherein the following condition is satisfied:

$$1.6 < f2/f(1\text{-}2) < 1.9$$

where
   f2 is the focal length of said second lens group, and
   f(1-2) is the composite focal length of said first lens group and said second lens group.

8. The projection optical system of claim 3, wherein the following condition is satisfied:

$$1.6 < f2/f(1\text{-}2) < 1.9$$

where
- f2 is the focal length of said second lens group, and
- f(1-2) is the composite focal length of said first lens group and said second lens group.

9. A projection optical system having an optical axis and comprised of:
- a first lens group of positive refractive power;
- a second lens group of positive refractive power;
- a diaphragm;
- a third lens group of positive refractive power; and
- a fourth lens group of positive refractive power;

wherein
- said second lens group and said third lens group are movable along the optical axis of the projection optical system in order to vary the magnification of the projection optical system;
- the range of movement of said second lens group and said third lens group along the optical axis includes a position where the first lens group and the second lens group as a first lens unit and the third lens group and the fourth lens group as a second lens unit are positioned symmetrically on opposite sides of a plane that includes said diaphragm so that the first and second lens units are mirror images of one another with regard to said plane so that the optical projection system achieves at least very nearly unity magnification when said second lens group and said third lens group are at said position;
- said second lens group and said third lens group are movable in the same direction and at the same rate along the optical axis of the projection optical system in order to vary the magnification of the projection optical system; and
- the following condition is satisfied:

$$1.6 < f2/f(1-2) < 1.9$$

where
- f2 is the focal length of said second lens group, and
- f(1-2) is the composite focal length of said first lens group and said second lens group.

10. The projection optical system of claim 4, wherein the following condition is satisfied:

$$1.6 < f2/f(1-2) < 1.9$$

where
- f2 is the focal length of said second lens group, and
- f(1-2) is the composite focal length of said first lens group and said second lens group.

11. A projection exposure device comprised of:
- the projection optical system of claim 1;
- an illumination optical system for emitting an illuminating beam; and
- a mask pattern for modulating the illuminating beam;

wherein
- said projection optical system forms an image of said mask pattern with the illuminating beam modulated by said mask pattern.

12. A projection exposure device comprised of:
- the projection optical system of claim 2;
- an illumination optical system for emitting an illuminating beam; and
- a mask pattern for modulating the illuminating beam;

wherein
- said projection optical system forms an image of said mask pattern with the illuminating beam modulated by said mask pattern.

13. A projection exposure device comprised of:
- the projection optical system of claim 3;
- an illumination optical system for emitting an illuminating beam; and
- a mask pattern for modulating the illuminating beam;

wherein
- said projection optical system forms an image of said mask pattern with the illuminating beam modulated by said mask pattern.

14. A projection exposure device comprised of:
- the projection optical system of claim 4;
- an illumination optical system for emitting an illuminating beam; and
- a mask pattern for modulating the illuminating beam;

wherein
- said projection optical system forms an image of said mask pattern with the illuminating beam modulated by said mask pattern.

15. A projection exposure device comprised of:
- the projection optical system of claim 5;
- an illumination optical system for emitting an illuminating beam; and
- a mask pattern for modulating the illuminating beam;

wherein
- said projection optical system forms an image of said mask pattern with the illuminating beam modulated by said mask pattern.

16. A projection exposure device comprised of:
- the projection optical system of claim 6;
- an illumination optical system for emitting an illuminating beam; and
- a mask pattern for modulating the illuminating beam;

wherein
- said projection optical system forms an image of said mask pattern with the illuminating beam modulated by said mask pattern.

* * * * *